United States Patent [19]

Robeson

[11] 4,246,381

[45] Jan. 20, 1981

[54] POLYARYLATE BLENDS WITH COPOLYESTERS

[75] Inventor: Lloyd M. Robeson, Whitehouse Station, N.J.

[73] Assignee: Union Carbide Corporation, New York, N.Y.

[21] Appl. No.: 49,134

[22] Filed: Jun. 18, 1979

[51] Int. Cl.$^3$ ............................................. C08L 67/02
[52] U.S. Cl. ..................................................... 525/444
[58] Field of Search ......................................... 525/444

[56] References Cited

U.S. PATENT DOCUMENTS

| 3,381,058 | 4/1968 | Caldwell et al. | 525/444 X |
|---|---|---|---|
| 3,728,416 | 4/1973 | Akin | 525/444 X |
| 3,946,091 | 3/1976 | Sakata et al. | 260/33.8 R X |
| 4,096,202 | 6/1978 | Farnham et al. | 260/40 R X |
| 4,117,034 | 9/1978 | Steffancin | 260/873 X |
| 4,124,652 | 11/1978 | Quinn et al. | 260/40 R X |
| 4,125,571 | 11/1978 | Scott et al. | 260/40 R X |
| 4,125,572 | 11/1978 | Scott | 260/40 R X |

FOREIGN PATENT DOCUMENTS

| 2601961 | 7/1976 | Fed. Rep. of Germany | 525/444 |
|---|---|---|---|
| 1002545 | 8/1965 | United Kingdom . | |

*Primary Examiner*—Carman J. Seccuro
*Attorney, Agent, or Firm*—Donald M. Papuga

[57] ABSTRACT

Described herein are blends of polyarylates derived from a dihydric phenol and an aromatic dicarboxylic acid and a copolyester derived from a cyclohexanedimethanol, an alkylene glycol and an aromatic dicarboxylic acid. These blends have improved processability, weatherability and impact properties.

10 Claims, No Drawings

POLYARYLATE BLENDS WITH COPOLYESTERS

BACKGROUND OF THE INVENTION

This invention is directed to a blend of a polyarylate and a copolyester which has improved processability relative to the polyarylate and improved weatherability, impact properties and heat distortion temperature relative to the copolyester. The composition of this invention comprises a polyarylate derived from a dihydric phenol and an aromatic dicarboxylic acid, and a copolyester derived from a cyclohexanedimethanol, an alkylene glycol and an aromatic dicarboxylic acid.

Polyarylates are aromatic polyesters derived from a dihydric phenol, particularly 2,2-bis(4-hydroxyphenyl)-propane (also identified as Bisphenol-A) and an aromatic dicarboxylic acid, particularly mixtures of terephthalic and isophthalic acids.

Polyarylates are high temperature, high performance thermoplastic polymers with a good combination of thermal and mechanical properties. They have a high continuous use temperature of about 130° C., and good unnotched toughness, with a pendulum impact value of greater than 300 ft. lbs./in.$^3$. Additionally, polyarylates have inherent flammability and combustion resistance. The polyarylates have good melt stability at high temperatures and good color retention. They also have good processability which allows them to be molded into a variety of articles. However, polyarylates are generally processed by injection molding or extruding at temperatures greater than about 330° C. These high processing temperatures may require the use of special equipment, such as heated molds. Thus, it is desirable to improve the processability of polyarylates.

It has been unexpectedly found that the addition of a copolyester derived from a cyclohexanedimethanol, an alkylene glycol, and an aromatic dicarboxylic acid to a polyarylate improves the processability of the polyarylate in that it increases melt flow resulting in lowering of the molding temperature. Also, molding conditions as well as the mold temperature are lowered by adding the copolyester to the polyarylate.

Polyarylates have good weatherability, i.e. they retain their mechanical properties after exposure to conditions of ultraviolet light and moisture. However, the weatherability of polyesters containing cyclohexanedimethanol groups is generally poor since they loose their mechanical properties, i.e., impact properties upon exposure to ultraviolet light and moisture conditions.

It was thus unexpected that the addition of polyarylate, even in small amounts, to a copolyester containing cyclohexanedimethanol groups, results in a composition having improved weatherability.

Additionally, polymer blends, even those comprised of transparent polymeric materials, usually yield an opaque composition. The blend of polyarylate and copolyester as described herein surprisingly yield transparent compositions.

British Pat. No. 1,002,545 describes a blend wherein one of the components is a polyester of terephthalic acid and one or more aliphatic diols and the other component is a polyarylate of 2,2-di-(4-hydroxyphenyl)-propane and terephthalic and isophthalic acid, the ratio of terephthalate residues to isophthalate residues in the copolyester ranging from 90:10 to 10:90.

The British Patent describes that the blend of the polyester and polyarylate provides an easily moldable polymer blend without the disadvantage when molding each of the two components alone. The examples of the British Patent describe a blend of poly(ethylene terephthalate) and a polyarylate of 2,2-di(4-hydroxyphenyl)propane and isophthalic and terephthalic acid. The British patent states that the aliphatic diol from which the polyester is derived may be cycloaliphatic such as 1,4-di-(hydroxymethyl)cyclohexane.

This British Patent does not suggest that easily moldable blends of a polyarylate of a dihydric phenol and an aromatic dicarboxylic acid can be improved by the addition of a copolyester derived from a cyclohexanedimethanol, an alkylene glycol and a dicarboxylic acid or that the weatherability of the copolyester is improved by the addition of the polyarylate. Also, the British Patent does not suggest that the addition of the copolyester described in this invention to a polyarylate yields better impact strength in a blend with a polyarylate than the blend of polyester and polyarylate described in the British Patent.

DESCRIPTION OF THE INVENTION

It has now been found that the processability of a polyarylate derived from a dihydric phenol and an aromatic dicarboxylic acid can be improved by the addition of a copolyester derived from a cyclohexanedimethanol, an alkylene glycol and an aromatic dicarboxylic acid. Moreover, it has been further unexpectedly found that the addition of said polyarylate to said copolyester results in a composition having improved weatherability in comparison to the copolyester without polyarylate.

Additionally, it has been found that the notched izod impact value of a blend of a polyarylate and said copolyester is improved in comparison to a blend of polyarylate and poly(alkylene terephthalates) or polyesters derived from a cycloaliphatic diol and terephthalic acid.

The composition of this invention comprises in admixture:

(a) a polyarylate derived from a dihydric phenol and an aromatic dicarboxylic acid; and (b) a copolyester derived from a cyclohexanedimethanol, an alkylene glycol and an aromatic dicarboxylic acid.

The polyarylates of this invention are derived from a dihydric phenol and an aromatic dicarboxylic acid.

A particularly desirable dihydric phenol is of the following formula:

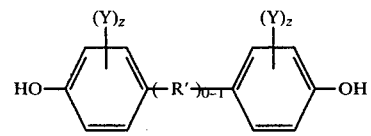

wherein Y is selected from alkyl groups of 1 to 4 carbon atoms, chlorine or bromine, z has a value of from 0 to 4, inclusive, and R' is a divalent saturated aliphatic hydrocarbon radical, particularly alkylene and alkylidene radicals having from 1 to 3 carbon atoms, and cycloalkylene radicals having up to and including 9 carbon atoms. The preferred dihydric phenol is Bisphenol-A. The dihydric phenols may be used individually or in combination. Additionally, said dihydric phenols can be used in combination with a dihydric phenol of the following formula:

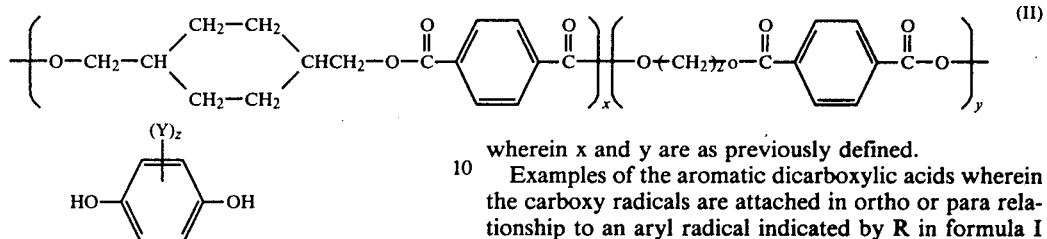

wherein Y and z are as previously defined.

Suitable aromatic dicarboxylic acids are terephthalic acid, isophthalic acid, naphthalene dicarboxylic acids and mixtures thereof, as well as alkyl substituted homologs of these carboxylic acids wherein the alkyl groups contain from 1 to about 4 carbon atoms, and acids containing other inert substituents such as halides, alkyl or aryl ethers, and the like.

The polyarylates contain from about 95 to 0 mole percent of terephthalic acid and from about 5 to 100 mole percent of isophthalic acid. More preferably, the polyarylates contain a mixture of from about 30 to about 70 mole percent of terephthalic acid and from about 70 to about 30 mole percent of isophthalic acid. A polyarylate containing a mixture of 50 mole percent of terephthalic acid and 50 mole percent of isophthalic acid is most preferred.

The polyarylates of the present invention can be prepared by any of the well known prior art polyester forming reactions, such as by the reaction of the acid chlorides of the aromatic dicarboxylic acids with the dihydric phenol, the reaction of the diaryl esters of the aromatic dicarboxylic acids with the dihydric phenol, and the reaction of the aromatic diacids with diester derivatives of the dihydric phenol. These processes are described in, for example, U.S. Pat. Nos. 3,317,464; 3,948,856; 3,780,148; 3,824,213 and 3,133,898.

These polyarylates have a reduced viscosity of from about 0.4 to about 1.0 as measured in p-chlorophenol at 49° C. (0.2 g/100 ml).

The copolyesters of this invention are derived from a cyclohexanedimethanol, an alkylene glycol and an aromatic dicarboxylic acid. Specifically, these copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following general formula:

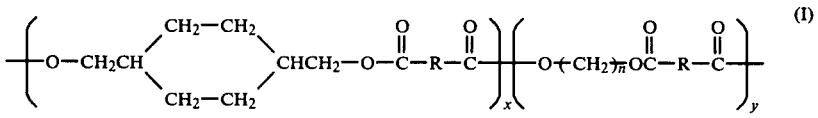

wherein the cyclohexane ring is selected from the cis- and trans-isomers thereof, and R represents an aryl radical containing 6 to 20 carbon atoms, which is the decarboxylated residue derived from an aromatic dicarboxylic acid, n is an integer of 2 to 4, x units comprise from about 10 to about 90 percent by weight and y units comprise from about 10 to about 90 percent by weight.

The preferred copolyesters may be derived from the reaction of either the cis- or trans-isomer (or a mixture thereof) of 1,4-cyclohexanedimethanol and ethylene glycol with terephthalic acid. These copolyesters have repeating units of the following general formula:

$$\left( O-CH_2-CH\begin{matrix}CH_2-CH_2\\ \\ CH_2-CH_2\end{matrix}CHCH_2-O-\overset{O}{\underset{\|}{C}}-\underset{}{\bigcirc}-\overset{O}{\underset{\|}{C}} \right)_x \left( O(CH_2)_2O-\overset{O}{\underset{\|}{C}}-\underset{}{\bigcirc}-\overset{O}{\underset{\|}{C}}-O \right)_y \quad (II)$$

wherein x and y are as previously defined.

Examples of the aromatic dicarboxylic acids wherein the carboxy radicals are attached in ortho or para relationship to an aryl radical indicated by R in formula I include isophthalic acid or terephthalic acid, 1,2-di-(p-carboxyphenyl)ethane, 4,4'-dicarboxydiphenyl ether, etc. and mixtures of these. All of these acids contain at least one hexacarbocyclic nucleus. Fused rings can also be present such as in 1,4- or 1,5-naphthalene-dicarboxylic acids.

The preferred aromatic dicarboxylic acid is terephthalic acid or mixtures of terephthalic and isophthalic acids.

The most preferred copolyester is derived from the reaction of 1,4-cyclohexanedimethanol and ethylene glycol with terephthalic acid wherein the molar ratio of dimethanol to glycol to acid is 1 to 2 to 3.

These polyesters are either commercially available or can be produced by methods well known in the art such as those set forth in, for example, U.S. Pat. No. 2,901,466.

The polyesters used herein have an intrinsic viscosity of at least about 0.4 to about 2.0 dl/g. measured in a 60:40 phenol/tetrachloroethane mixture of similar solvent at 25°–30° C. The intrinsic viscosity is defined by the following relationship:

$$[\eta] = \lim_{C \to 0} \left( \frac{\eta SP}{C} \right)$$

wherein $\eta_{SP}$ = specific viscosity, and C = the concentration in dl/g.

The polyarylates and copolyesters are combinable with each other in all proportions. The polyarylate is used in amounts of from about 2 to about 85 weight percent, preferably from about 15 to about 80 weight percent. The copolyester is used in amounts of from about 15 to about 98 weight percent, preferably from about 20 to about 85 weight percent.

The compositions of this invention are prepared by any conventional mixing methods. For example, a preferred method comprises mixing the polyarylate and copolyester in powder or granular form in an extruder and extruding the mixture into strands, chopping the strands into pellets and molding the pellets into the desired article.

It should, of course, be obvious to those skilled in the art that other additives may be included in the present compositions. These additives include plasticizers; pigments; flame retardant additives; reinforcing agents, such as glass fibers; stabilizers; processing aids; impact modifiers, as disclosed in U.S. patent application Ser. No. 049,131 of L. M. Robeson, titled "Impact Modified Polyarylate Blends" and filed on June 18, 1979. This patent application Ser. No. 049,131 describes polyarylate molding compositions, having improved notched izod impact values, comprising a blend of a polyarylate derived from a dihydric phenol and an aromatic dicarboxylic acid, a polyester derived from an aliphatic or cycloaliphatic diol, or mixtures thereof, and an aromatic dicarboxylic acid, and an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi (as measured by ASTM D-638, except that the test piece is compression molded to a 20 mil thickness). Also, decabromodiphenyl oxide may be included in said composition as described in patent application Ser. No. 049,131.

EXAMPLES

The following examples serve to give specific illustrations of the practice of this invention but they are not intended in any way to limit the scope of this invention.

Control A 60 weight percent of a polyarylate (Ardel D-100, sold by Union Carbide Corporation and prepared from Bisphenol-A and a mixture of 50 mole percent each of terephthalic and isophthalic acid chlorides by conventional methods) having a reduced viscosity of 0.66 as measured in p-chlorophenol at 49° C. (0.2 g/100 ml) was blended with 40 weight percent of poly(ethylene terephthalate) having an intrinsic viscosity of 0.64 as measured in a 60/40 1,1,2,2-tetrachloroethane/phenol mixture at 25° C.

This blend was prepared by extrusion blending the components at about 270° C. in a single screw 1-inch diameter extruder with L/D=36/1. The extrudate was chopped into pellets. The pelletized product was then injection molded into ASTM test specimens (at 270°-300° C.) using a Newbury 1¼ ounce screw injection molding machine. The test specimens were measured for the following properties: tensile strength and modulus according to ASTM D-638; elongation at break according to ASTM D-638; tensile impact strength according to ASTM D-1822; notched izod impact strength according to ASTM D-256; heat distortion temperature measured at 264 psi on a ⅛ inch thick unannealed test bar according to ASTM D-635.

The results are shown in Table I.

Control B 60 weight percent of the polyarylate described in Control A was blended with 40 weight percent of poly(1,4-cyclohexanedimethanol tere/isophthalate) (commercially available from Tennessee Eastman Co. under the designation 7-DRO, the terephthalate to isophthalate ratio is 1:1). The blend was prepared by extrusion blending the components in an extruder by the procedure as described in Control A. The extrudate was chopped into pellets, molded into test bars and tested by the procedures as described in Control A.

The results are shown in Table I.

Control C 60 weight percent of the polyarylate described in Control A was blended with 20 weight percent of the poly(ethylene terephthalate) described in Control A and 20 weight percent of the poly(1,4-cyclohexanedimethanol tere/isophthalate) described in Control B in an extruder by the procedure as described in Control A. The extrudate was chopped into pellets, molded into test bars and tested by the procedures as described in Control A.

The results are shown in Table I.

Example 1

60 weight percent of the polyarylate described in Control A was blended with 40 weight percent of a copolyester PETG-6763 (a polyester prepared by the reaction of cyclohexanedimethanol and ethylene glycol with terephthalic acid in a molar ratio of 1:2:3; this polyester has an $M_n$ of about 26,000 and is sold by Tennessee Eastman Company). The blend was prepared by the procedure as described in Control A. The extrudate was chopped into pellets, molded into test bars and tested by the procedures as described in Control A.

The results are shown in Table I.

Control D 67 weight percent of the polyarylate of Control A was blended with 33 weight percent of the poly(ethyleneterephthalate) described in Control A in an extruder by the procedure as described in Control A. The extrudate was chopped into pellets, molded into test bars and tested by the procedures as described in Control A.

The results are shown in Table I.

Example 2

67 weight percent of the polyarylate of Control A was blended with 33 weight percent of the copolyester, PETG-6763, described in Example 1 in an extruder by the procedure as described in Control A. The extrudate was chopped into pellets, molded into test bars and tested by the procedures as described in Control A.

The results are shown in Table I.

Control E 75 weight percent of the polyarylate described in Control A was blended with 25 weight percent of the poly(1,4-cyclohexanedimethanol tere/isophthalate) polyester described in Control B in an extruder by the procedure as described in Control A. The extrudate was chopped into pellets, molded into test bars and tested by the procedures as described in Control A.

The results are shown in Table I.

Example 3

75 weight percent of the polyarylate described in Control A was blended with 25 weight percent of the copolyester, PETG-6763, described in Example 1 in an extruder by the procedure as described in Control A. The extrudate was chopped into pellets, molded into test bars and tested by the procedures as described in Control A.

The results are shown in Table I.

Control F

The procedure of Control E was exactly repeated except that 50 weight percent of the polyarylate and 50 weight percent of the poly(1,4-cyclohexanedimethanol-tere/isophthalate) was used.

The results are shown in Table I.

Example 4

The procedure of Example 3 was exactly repeated except that 50 weight percent of the polyarylate and 50 weight percent of the copolyester, PETG-6763, was used.

The results are shown in Table I.

Control G

The procedure of Control E was exactly repeated except that 100 weight percent of the copolyester, PETG-6763, described in Example 1 was used.

The results are shown in Table I.

The results in Table I show that the notched izod impact values of a blend of polyarylate with a copolyester derived from a cyclohexanedimethanol, an alkylene glycol and an aromatic dicarboxylic acid (Examples 1 to 4), according to the present invention, are improved over a blend of polyarylate and poly(ethylene terephthalate) as shown and Controls A and D. Also, the blends of the present invention (Examples 1 to 4) have improved notched izod impact values as compared to a blend of polyarylate and poly(1,4-cyclohexanedimethanol tere/isophthalate). The remaining properties, i.e., tensile modulus, tensile strength, elongation tensile impact strength and heat distortion temperature of the blends of this invention are within acceptable limits.

sample being $\frac{1}{8}$ inch wide) held at both ends and struck in the center. The pendulum impact strength is measured in ft.-lbs./in.$^3$. The initial pendulum impact strength of the sample after molding is reported in Table II, and the percent of the retention of the initial impact strength of the sample is reported after 500, 1,000, 2,000 and 4,000 hours of exposure in the weathering unit.

The results are shown in Table II.

Example 5

The procedure of Control H was exactly repeated except that 95 weight percent of the copolyester was blended with 5 weight percent of polyarylate (Ardel D-100 described in Control A) in an extruder at 270° C. The extruder was a single screw 1-inch diameter extruder with L/D=36/1. The extrudate was then compression molded into test samples and these samples tested by the procedures as described in Control H.

The results are shown in Table II.

Example 6

The procedure of Control G was exactly repeated except that 80 weight percent of the copolyester was blended with 20 weight percent of polyarylate (Ardel D-100 described in Control A) in an extruder as described in Example 5. The extrudate was then compres-

TABLE I

| Example | Description of the Composition[1] Polymer | (wt. %) | Tensile Modulus (psi) | Tensile Strength (psi) | Elongation (%) | Tensile Impact Strength (ft.-lbs./in.$^2$) | Tensile Impact Strength (ft.-lbs./in.$^3$) | Notched Izod Impact Strength (ft.-lbs./in. of Notch) | Heat Distortion Temp. (°C.) |
|---|---|---|---|---|---|---|---|---|---|
| Control A | PA | 60 | 333,000 | 10,200 | 158 | 139 | 335 | 1.25 | 102 |
|  | PET | 40 |  |  |  |  |  |  |  |
| Control B | PA | 60 | 348,000 | 9,710 | 23 | 61 | — | 1.20 | 103 |
|  | CHDTI | 40 |  |  |  |  |  |  |  |
| Control C | PA | 60 | 333,000 | 9,790 | 65 | 60 | — | 1.5 | 108 |
|  | PET | 20 |  |  |  |  |  |  |  |
|  | CHDTI | 20 |  |  |  |  |  |  |  |
| 1 | PA | 60 | 319,000 | 9,540 | 62 | 143 | 329 | 2.0 | 104 |
|  | PETG | 40 |  |  |  |  |  |  |  |
| Control D | PA | 67 | 331,000 | 10,000 | 57 | 142 | — | 1.2 | 102 |
|  | PET | 33 |  |  |  |  |  |  |  |
| 2 | PA | 67 | 321,000 | 9,710 | 33 | 133 | 305 | 2.5 | 113 |
|  | PETG | 33 |  |  |  |  |  |  |  |
| Control E | PA | 75 | 362,000 | 9,710 | 23 | 7 | 22 | 1.1 | — |
|  | CHDTI | 25 |  |  |  |  |  |  |  |
| 3 | PA | 75 | 309,000 | 9,900 | 20 | 26 | 102 | 2.6 | 124 |
|  | PETG | 25 |  |  |  |  |  |  |  |
| Control F | PA | 50 | 313,000 | 9,140 | 73 | 81 | — | 0.6 | — |
|  | CHDTI | 50 |  |  |  |  |  |  |  |
| 4 | PA | 50 | 314,000 | 9,470 | 83 | 171 | 303 | 1.6 | — |
|  | PETG |  |  |  |  |  |  |  |  |
| Control G | PETG | 100 | 277,000 | 7,390 | 287 | 135 | — | 1.35 | 70 |

[1]PA = polyarylate
PET = poly(ethylene terephthalate)
CHDTI = poly(1,4-cyclohexanedimethanol tere/isophthalate)
PETG = PETG-6763 defined in Example I.

Control H 100 weight percent of a copolyester, PETG-6763, was compression molded at 270° C. into 4×4×0.020 inch test samples in a 20 mil cavity mold. The test samples were then exposed in an artificial weathering unit for 500, 1,000, 2,000 and 4,000 hours, by the procedure and equipment as described in ASTM D-1499. The impact strength of the test samples was measured after they were molded and after 500, 1,000, 2,000 and 4,000 hours of exposure in the weathering unit. The impact strength was measured by the pendulum impact strength test. This test measures the energy absorbed by a pendulum arm striking and breaking the sample (the sion molded into test samples and these samples tested by the procedures as described in Control H.

The results are shown in Table II.

Example 7

The procedure of Control G was exactly repeated except that 50 weight percent of the copolyester was blended with 50 weight percent of polyarylate (Ardel D-100 described in Control A) in an extruder as described in Example 5. The extrudate was then compression molded into test samples and these samples tested by the procedures as described in Control H.

The results are shown in Table II.

Control I

The procedure of Control G was exactly repeated except that 100 weight percent of a polyarylate (Ardel D-100 described in Control A) was substituted for the copolyester.

The results are shown in Table II.

The data in Table II show that the addition of even minor amounts of polyarylate, i.e., 5 weight percent, to the copolyester surprisingly results in an improvement in the retention of impact strength after exposure in a Weather-O-Meter even up to 4,000 hours.

TABLE II

| Example | Description of the Composition[1] Polymer | (wt. %) | Initial Impact Strength (ft.-lbs./in.$^3$) | Retention of Initial Impact Strength (%) after Exposure in Weather-O-Meter for: | | | | |
|---|---|---|---|---|---|---|---|---|
| | | | | 0 | 500 | 1000 | 2000 | 4000 (hrs.) |
| Control H | PETG | 100 | 82 | 100 | 8.5 | 6.1 | 3.7 | 3.7 |
| 5 | PETG | 95 | 82 | 100 | 61 | 48 | 60 | 51 |
| | PA | 5 | | | | | | |
| 6 | PETG | 80 | 109 | 100 | 71 | 66 | 70 | 64 |
| | PA | 20 | | | | | | |
| 7 | PETG | 50 | 129 | 100 | 83 | 82 | 55 | 53 |
| | PA | 50 | | | | | | |
| Control I | PA | 100 | 340 | 100 | 49 | 65 | 44 | 28 |

[1] PA = polyarylate (Ardel D-100).
PETG = PETG-6763 defined in Example 1.

The data of the following Table III shows that the addition of a copolyester (PETG-6763), to polyarylate to provide the blend of this invention gives improved processability. Improved processability is shown by the increased melt flow in the Table. Increased melt flow results in a lower injection molding temperature. The melt flow was measured on 100 weight percent polyarylate (Control I), a blend of 75 weight percent polyarylate and 25 weight percent copolyester, PETG-6763, (Example 3), and a blend of 50 weight percent polyarylate and 50 weight percent of copolyester, PETG-6763, (Example 4). The melt flow is measured by the procedure and apparatus as described in ASTM-D1238.

The data in Table III shows that the molding temperature can be lowered by about 50° C., i.e., from 350° to 300° C. by the addition of 25 weight percent of the copolyester to the polyarylate. Also, when 50 weight percent of the copolyester is added to the polyarylate, the molding temperature can be lowered by about 75° C., i.e., from 350° to 275° C.

| | Description of the Composition | | | | | |
|---|---|---|---|---|---|---|
| Example | Polymer | (wt. %) | Melt Flow (dg./min) at 275° C. | 300° C. | 325° C. | 350° C. |
| Control I | PA | 100 | — | 0.38 | 1.2 | 4.4 |
| 3 | PA | 75 | — | 11.2 | 30.0 | — |
| 4 | PETG PA PETG | 25 50 50 | 11.7 | 79.2 | — | — |

[1] PA - polyarylate
PETG = PETG-6763 defined in Example I.

The data of the following Table IV show that the addition of a copolyester (PETG-6763) to polyarylate, to provide the blend of this invention improves the processability of the polyarylate. The processability was measured on samples of 100 weight percent polyarylate (Control I), a blend of 75 weight percent polyarylate and 25 weight percent of the copolyester, PETG-6763, (Example 3), a blend of 67 weight percent polyarylate and 33 weight percent of the copolyester, PETG-6763, (Example 2), and a blend of 60 weight percent polyarylate and 40 weight percent of copolyester, PETG-6763, (Example 1). The samples were injection molded in a 1¼ ounce Newbury Screw Injection Molding Machine with a two cavity test specimen mold. The cylinder temperature (rear, mid and nozzle), mold temperature, extruder screw speed in revolutions per minute, injection pressure (psi) and cycle time (seconds) are set forth in Table IV.

The data of Table IV show that the processability of the polyarylate is improved by the addition of the copolyester, since as the blend of polyarylate and copolyesters contains more copolyester, the injection molding conditions as well as the mold temperature are lowered.

TABLE IV

| | Description of the Composition[1] | | Injection Molding Conditions | | | | | | |
|---|---|---|---|---|---|---|---|---|---|
| | | | Cylinder Temperature (°F.) | | | Mold | Screw | Inj. | Cycle |
| Example | Polymer | (wt. %) | Rear | Mid | Nozzle | Temp (°C.) | Speed (RPM) | Pressure (psi) | Time (sec.) |
| Control I | PA | 100 | 680 | 690 | 660 | 140 | 120 | 1250 | 52 |
| 3 | PA | 75 | 630 | 590 | 580 | 120 | 100 | 850 | 52 |
| | PETG | 25 | | | | | | | |
| 2 | PA | 67 | 590 | 560 | 550 | 100 | 80 | 975 | 52 |
| | PETG | 33 | | | | | | | |
| 1 | PA | 60 | 570 | 540 | 530 | 80 | 50 | 1050 | 52 |
| | PETG | 40 | | | | | | | |

[1] PA = polyarylate
PETG = PETG-6763 defined in Example 1.

What is claimed is:

1. A thermoplastic molding composition comprising in admixture:

(a) from about 2 to about 85 weight percent of a polyarylate derived from a dihydric phenol and an aromatic dicarboxylic acid; and (b) from about 15 to about 98 weight percent of a copolyester derived from a cyclohexanedimethanol, an alkylene glycol and an aromatic dicarboxylic acid, said copolyester having an intrinsinc viscosity of at least about 0.4 to about 2.0 dl/g.

2. A composition as defined in claim 1 wherein said polyarylate is derived from a dihydric phenol or a mixture of dihydric phenols, said dihydric phenol having the following formula:

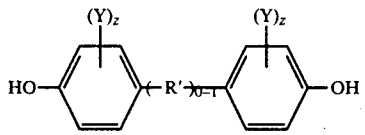

wherein Y is selected from alkyl groups of 1 to 4 carbon atoms, chlorine or bromine, z has a value of 0 to 4, inclusive and R' is a divalent saturated aliphatic hydrocarbon radical having from 1 to 3 carbon atoms and cycloalkylene radicals having up to and including 9 carbon atoms, and a dicarboxylic acid.

3. A composition as defined in claim 2 wherein the dihydric phenol is used in combination with a dihydric phenol of the following formula:

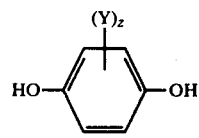

wherein Y is selected from alkyl groups of 1 to 4 carbon atoms, chlorine or bromine and z has a value of 0 to 4.

4. A composition as defined in claim 2 wherein the polyarylate is derived from Bisphenol-A and an aromatic-dicarboxylic acid.

5. A composition as defined in claim 1 wherein the polyarylate is derived from a dihydric phenol and isophthalic acid.

6. A composition as defined in claim 1 wherein the polyarylate is derived from a dihydric phenol and a mixture of isophthalic acid and terephthalic acid.

7. A composition as defined in claim 1 wherein the polyarylate is present in amounts of from about 15 to about 80 weight percent.

8. A composition as defined in claim 1 wherein the copolyester has repeating units of the following formula:

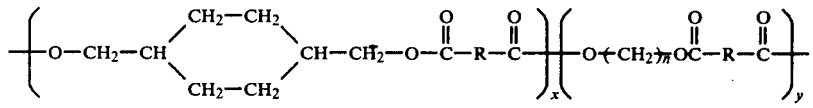

wherein the cyclohexane ring is selected from the group consisting of the cis- and trans-isomers thereof, R represents an aryl radical containing from 6 to 20 carbon atoms which is the decarboxylated residue derived from an aromatic dicarboxylic acid, n is an integer of 2 to 4, x units comprise from about 10 to about 90 percent by weight and y units comprise from about 10 to about 90 percent by weight.

9. A composition as defined in claim 8 wherein the copolyester has repeating units of the following formula:

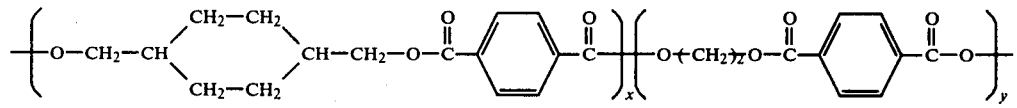

10. A composition as defined in claim 1 wherein the copolyester is present in amounts of from about 20 to about 85 weight percent.

* * * * *